(12) United States Patent
Ma (10) Patent No.: US 10,671,870 B2
(45) Date of Patent: Jun. 2, 2020

(54) DETERMINING USER AUTHENTICITY WITH FACE LIVENESS DETECTION

(71) Applicant: Alibaba Group Holding Limited, George Town (KY)

(72) Inventor: Chenguang Ma, Beijing (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 36 days.

(21) Appl. No.: 16/001,670

(22) Filed: Jun. 6, 2018

(65) Prior Publication Data

US 2018/0357501 A1     Dec. 13, 2018

(30) Foreign Application Priority Data

Jun. 7, 2017   (CN) .......................... 2017 1 0421333

(51) Int. Cl.
*G06K 9/00* (2006.01)
*G06K 9/62* (2006.01)

(52) U.S. Cl.
CPC ..... *G06K 9/00906* (2013.01); *G06K 9/00241* (2013.01); *G06K 9/00288* (2013.01); *G06K 9/00899* (2013.01); *G06K 9/6256* (2013.01)

(58) Field of Classification Search
CPC ........... G06K 9/00906; G06K 9/00241; G06K 9/00288; G06K 9/6256
See application file for complete search history.

(56) References Cited

U.S. PATENT DOCUMENTS

| 8,199,203 B2 | 6/2012 | Sugimoto |
| 9,396,537 B2* | 7/2016 | Hirvonen ................. G06T 7/32 |
| 10,095,917 B2* | 10/2018 | Taigman ............ G06K 9/00268 |
| 10,289,822 B2* | 5/2019 | Chandraker ......... G06K 9/6274 |
| 2003/0235332 A1* | 12/2003 | Moustafa ........... G06K 9/00241 382/157 |
| 2008/0260212 A1* | 10/2008 | Moskal ................ A61B 5/1079 382/118 |
| 2009/0135188 A1 | 5/2009 | Ding et al. |
| 2011/0299741 A1 | 12/2011 | Zhang et al. |
| 2016/0062456 A1 | 3/2016 | Wang et al. |
| 2017/0053174 A1 | 2/2017 | Fan et al. |
| 2018/0144243 A1* | 5/2018 | Hsieh ....................... G06N 3/08 |
| 2018/0276488 A1* | 9/2018 | Yoo ..................... G06K 9/00288 |

(Continued)

FOREIGN PATENT DOCUMENTS

| CN | 105740779 | 7/2016 |
| CN | 105740780 | 7/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Gregory M Desire
(74) *Attorney, Agent, or Firm* — Fish & Richardson P.C.

(57) ABSTRACT

A first deep learning model is trained to classify general facial images. Cropped facial images are extracted from the general facial images. A second deep learning model is trained based on the cropped facial images. Face liveness detection is performed based on the trained first deep learning model and the trained second deep learning model.

20 Claims, 6 Drawing Sheets

(56) References Cited

U.S. PATENT DOCUMENTS

2018/0357501 A1* 12/2018 Ma .................. G06K 9/00906
2019/0065994 A1* 2/2019 Wang ................ G06K 9/6256

FOREIGN PATENT DOCUMENTS

| | | |
|---|---|---|
| CN | 105874474 | 8/2016 |
| CN | 105956572 | 9/2016 |
| CN | 103440479 | 12/2016 |
| CN | 106203373 | 12/2016 |
| CN | 106599772 | 4/2017 |
| CN | 106709458 | 5/2017 |
| CN | 106778525 | 5/2017 |
| CN | 106780482 | 5/2017 |
| KR | 20150128510 | 11/2015 |
| TW | 201403547 | 1/2014 |
| TW | 201629851 | 8/2016 |

OTHER PUBLICATIONS

Nakamoto, "Bitcoin: A Peer-to-Peer Electronic Cash System," www.bitcoin.org, 2005, 9 pages.

Galbally et al., "Biometric Antispoofing Methods: A Survey in Face Recognition," IEEE Access, Jan. 2015, 2:1530-1552.

Lumini et al., Researchgate.net [online], "Overview of the combination of biometric matchers," May 2016, retrieved on Sep. 16, 2019, retrieved from URL<https://www.researchgate.net/publication/303363587_Overview_of_the_combination_of_biometric_matchers>, 28 pages.

Menotti et al., Researchgate.net [online], "Deep Representations for Iris, Face, and Fingerprint Spoofing Detection," Oct. 2014, retrieved on Sep. 16, 2019, retrieved from URL<https://www.researchgate.net/publication/266676858_Deep_Representations_for_Iris_Face_and_Fingerprint_Spoofing_Attack_Detection>, 15 pages.

PCT International Preliminary Report on Patentability in International No. PCT/US2018/036505, dated Sep. 16, 2019, 8 pages.

PCT International Search Report and Written Opinion in International Application No. PCT/US2018/036505, dated Oct. 9, 2018, 10 pages.

Yang et al., arxiv.org [online], "Learn Convolutional Neural Network for Face Anti-Spoofing," Aug. 2014, retrieved on Sep. 16, 2019, retrieved from URL<https://arxiv.org/abs/1408.5601>, 8 pages.

* cited by examiner

DETERMINING USER AUTHENTICITY WITH FACE LIVENESS DETECTION

This application claims priority to Chinese Patent Application No. 201710421333.5, filed on Jun. 7, 2017, which is hereby incorporated by reference in its entirety.

TECHNICAL FIELD

The present application relates to the field of computer software technologies, and in particular, to a face liveness detection method, apparatus, and electronic device.

BACKGROUND

A face liveness detection technology is used to determine whether the current user is the authentic user by using facial recognition techniques so as to intercept spoofing attacks such as a screen replay attack, a printed photo attack, and a three-dimensional modeling attack.

Currently, the face liveness detection technology can be classified into an intrusive face liveness detection technology and a non-intrusive face liveness detection technology. In the intrusive face liveness detection technology, a user needs to cooperatively complete some specific live actions such as blinking, head turning, or mouth opening. When performing facial recognition based on the given instructions, the liveness detection module can determine whether an operator accurately completes the live operation and whether the operator is the authentic user. In the non-intrusive face liveness detection technology, a user does not need to cooperatively complete a live action, so that user experience is better, but the technical complexity is higher. In addition, liveness detection is performed mainly depending on information about an input single frame image or information about other device sensors.

In the described non-intrusive face liveness detection technology in the existing technology, supervised training is usually performed on a single deep learning model by using live and non-live facial images, and then face liveness prediction is performed on the input single frame image by using the trained model.

However, such a technical solution heavily depends on a spoofing face attack type of training data, and is limited by an objective condition of insufficient training data. It is difficult to fully extract a live face image feature. As a result, this model cannot fully express a live face feature, and accuracy of a face liveness detection result is reduced.

SUMMARY

Embodiments of the present application provide a face liveness detection method, apparatus, and electronic device to resolve the following technical problems in the existing technology. In a technical solution based on a single deep learning model, it is difficult to fully extract a live face image feature. As a result, this model cannot fully express a live face feature, and accuracy of a face liveness detection result is reduced.

To resolve the described technical problems, the embodiments of the present application are implemented as follows:

An embodiment of the present application provides a face liveness detection method, including: training a first deep learning model based on the general facial images; training a second deep learning model based on the extracted facial images cropped from the general facial images; and performing face liveness detection based on the trained first deep learning model and the trained second deep learning model.

An embodiment of the present application provides a face liveness detection apparatus, including: a training module, configured to: train a first deep learning model based on the general facial images; and train a second deep learning model based on the extracted facial images cropped from the general facial images; and a detection module, configured to perform face liveness detection based on the trained first deep learning model and the trained second deep learning model.

At least one technical solution used in the embodiments of the present application can achieve the following beneficial effects. One such benefit is more live face image features are extracted. Compared with a model in the existing technology, the trained first deep learning model and the trained second deep learning model jointly better express the live face feature, thereby improving the accuracy of the face liveness detection result. Therefore, a part or all of problems in the existing technology can be resolved.

BRIEF DESCRIPTION OF DRAWINGS

To describe the technical solutions in embodiments of the present application or in the existing technology more clearly, the following briefly introduces the accompanying drawings required for describing the embodiments or the existing technology. The accompanying drawings in the following description show some embodiments of the present application, and a person of ordinary skill in the art can still derive other drawings from these accompanying drawings without creative efforts.

DESCRIPTION OF EMBODIMENTS

Embodiments of the present application provide a face liveness detection method, apparatus, and electronic device.

To make a person skilled in the art better understand the technical solutions in the present application, the following describes the technical solutions in the embodiments of the present application with reference to the accompanying drawings in the embodiments of the present application. The described embodiments are a part, rather than all, of the embodiments of the present application. All other embodiments obtained by a person of ordinary skill in the art based on the embodiments of the present application without creative efforts shall fall within the protection scope of the present application.

All deep learning models in a solution of the present application are based on a neural network. For ease of description, a core idea of the solution of the present application is first described based on an example and with reference to FIG. 1 and FIG. 2.

Figure 1:
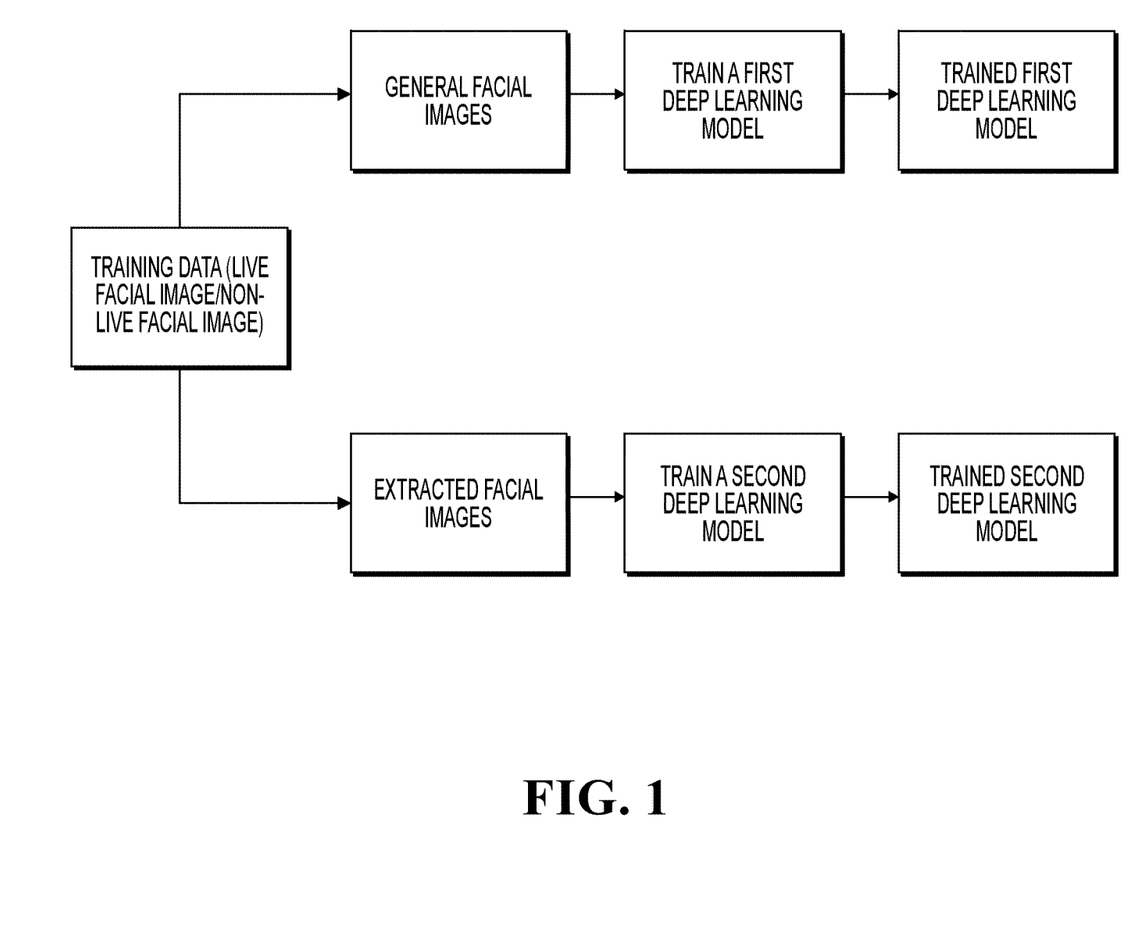
FIG. 1 is a schematic flowchart illustrating an example of a model training stage in a solution of the present application.
Figure 2:
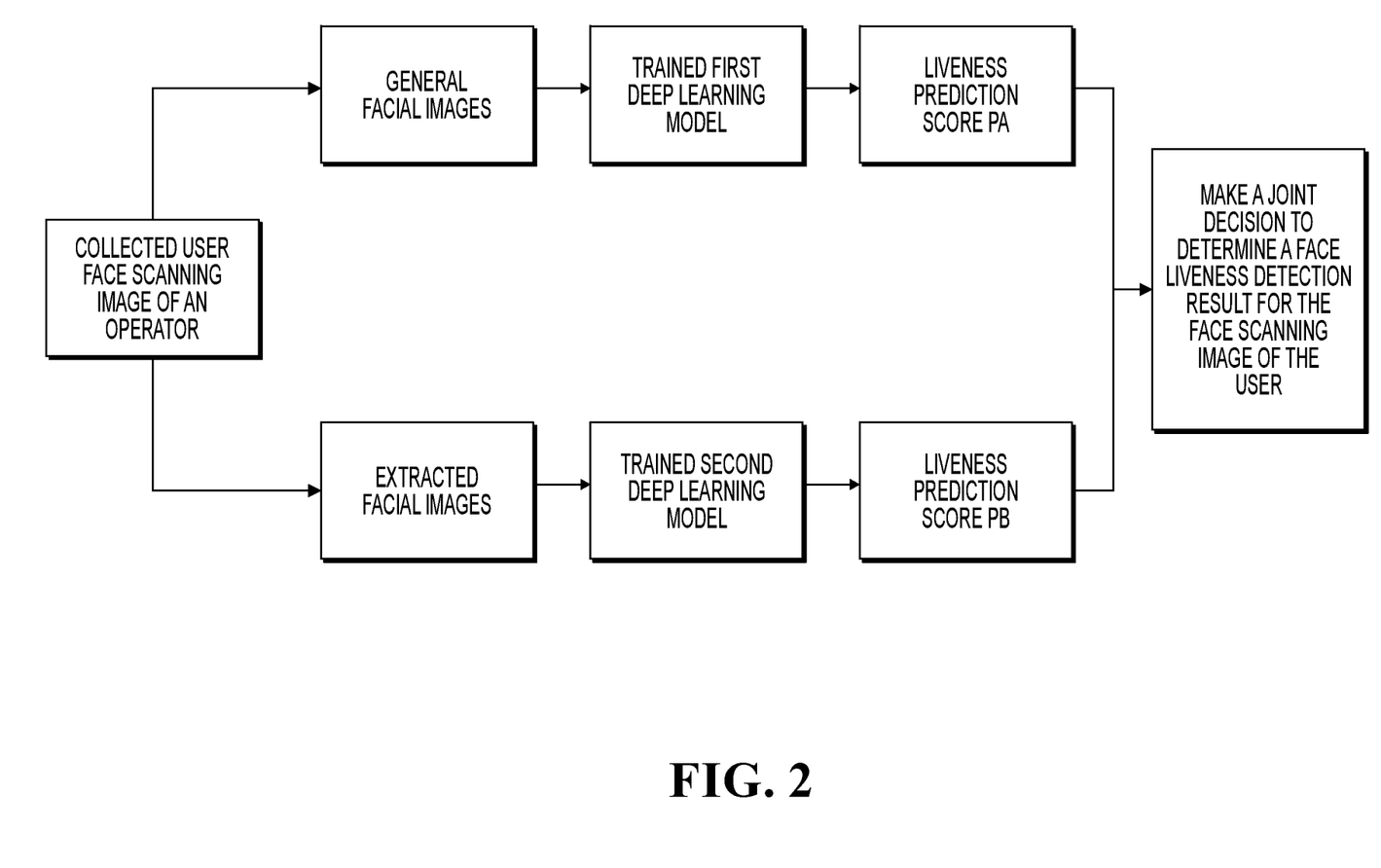
FIG. 2 is a schematic flowchart illustrating an example of a liveness detection stage in a solution of the present application.

In this example, the solution of the present application can be classified into a model training stage and a liveness detection stage.

FIG. 1 is a schematic flowchart illustrating an example of a model training stage in a solution of the present application. In a model training stage, two independent deep learning models are trained by using live and non-live samples (belonging to a training data set) in a facial image: a first deep learning model and a second deep learning model. An input image of the first deep learning model is a collected general facial image, and an input image of the second deep learning model can be an extracted facial image cropped from the general facial image. The first deep learning model and the second deep learning model can use different deep learning network structures (i.e., a structure of a neural network that a model is based on). Different network structures are differently sensitive to different image features. Live and non-live training data sets are used to complete training of the first deep learning model and the second deep learning model based on a deep learning method.

FIG. 2 is a schematic flowchart illustrating an example of a liveness detection stage in a solution of the present application. In a liveness detection stage, a face scanning image of a user is collected as a general facial image of the user, and a first deep learning model is input to obtain a prediction score PA. In addition, face detection is performed on the face scanning image of the user, an extracted facial image is cropped from the face scanning image of the user based on a detection result, and a second deep learning model is input to the extracted facial image, to obtain a prediction score PB. Afterwards, for example, a prediction score result of (PA+PB) can be compared with a determined threshold (e.g., the threshold can be 1), to make a joint decision to determine a face liveness detection result for the face scanning image of the user.

Based on the described core idea, the following describes the solution of the present application in detail.

Figure 3:
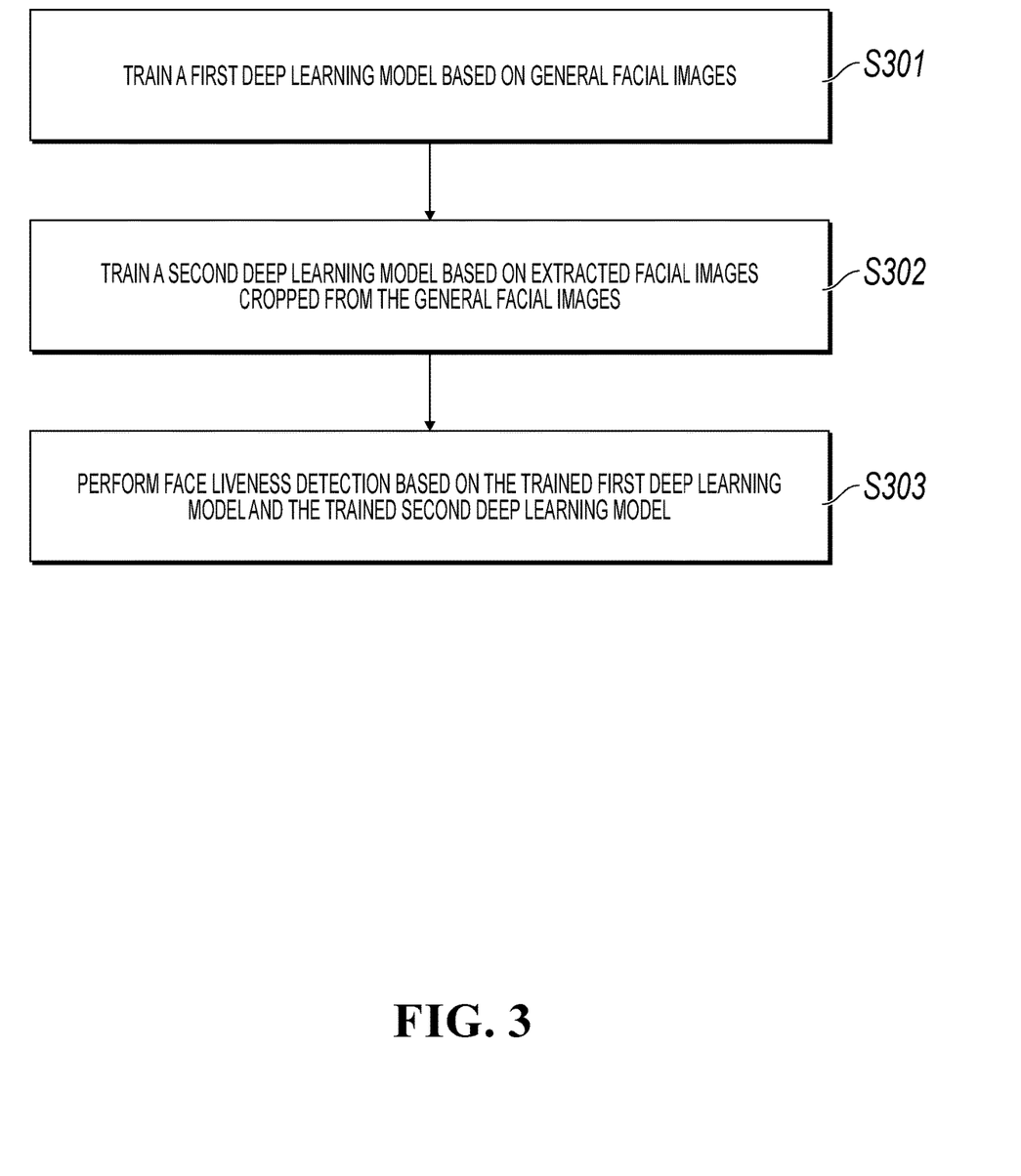
FIG. 3 is a schematic flowchart illustrating a face liveness detection method according to an embodiment of the present application.

FIG. 3 is a schematic flowchart illustrating a face liveness detection method according to an embodiment of the present application. From a perspective of a program, the procedure can be executed by a program on a server or a terminal, for example, an identity authentication program or an e-commerce application. From a perspective of a device, the procedure is executed by at least one of the following devices that can be used as a server or a terminal: an access control device, a personal computer, a medium computer, a computer cluster, a mobile phone, a tablet computer, an intelligent wearable device, a car machine, or a point of sale (POS).

The procedure in FIG. 3 can include the following steps.

S301. Train a first deep learning model based on general facial images.

In this embodiment of the present application, the general facial images used to train the first deep learning model can include a plurality of samples. In the plurality of samples, some are live facial images that are collected by shooting a live face and that can be used as positive samples, and some are non-live facial images that are collected by shooting a non-live face such as a face picture or a face model and that can be used as negative samples.

In this embodiment of the present application, the first deep learning model is a classification model, and the general facial images are used as inputs of the classification model. After model processing, the general facial images can be classified into at least the live facial image category or the non-live facial image category. An objective of training the first deep learning model is to improve classification accuracy of the first deep learning model.

S302. Train a second deep learning model based on extracted facial images cropped from the general facial images.

In this embodiment of the present application, in addition to an entire facial region, the general facial image generally includes some unrelated regions, such as a background region and a human body except a face. The extracted facial image can exclude the unrelated regions, and can include at least an extracted facial region, for example, an entire facial region, an eye region, or a nasal region. There can be one or more second deep learning models, and each second deep learning model can correspond to a type of facial regions.

Figure 4:
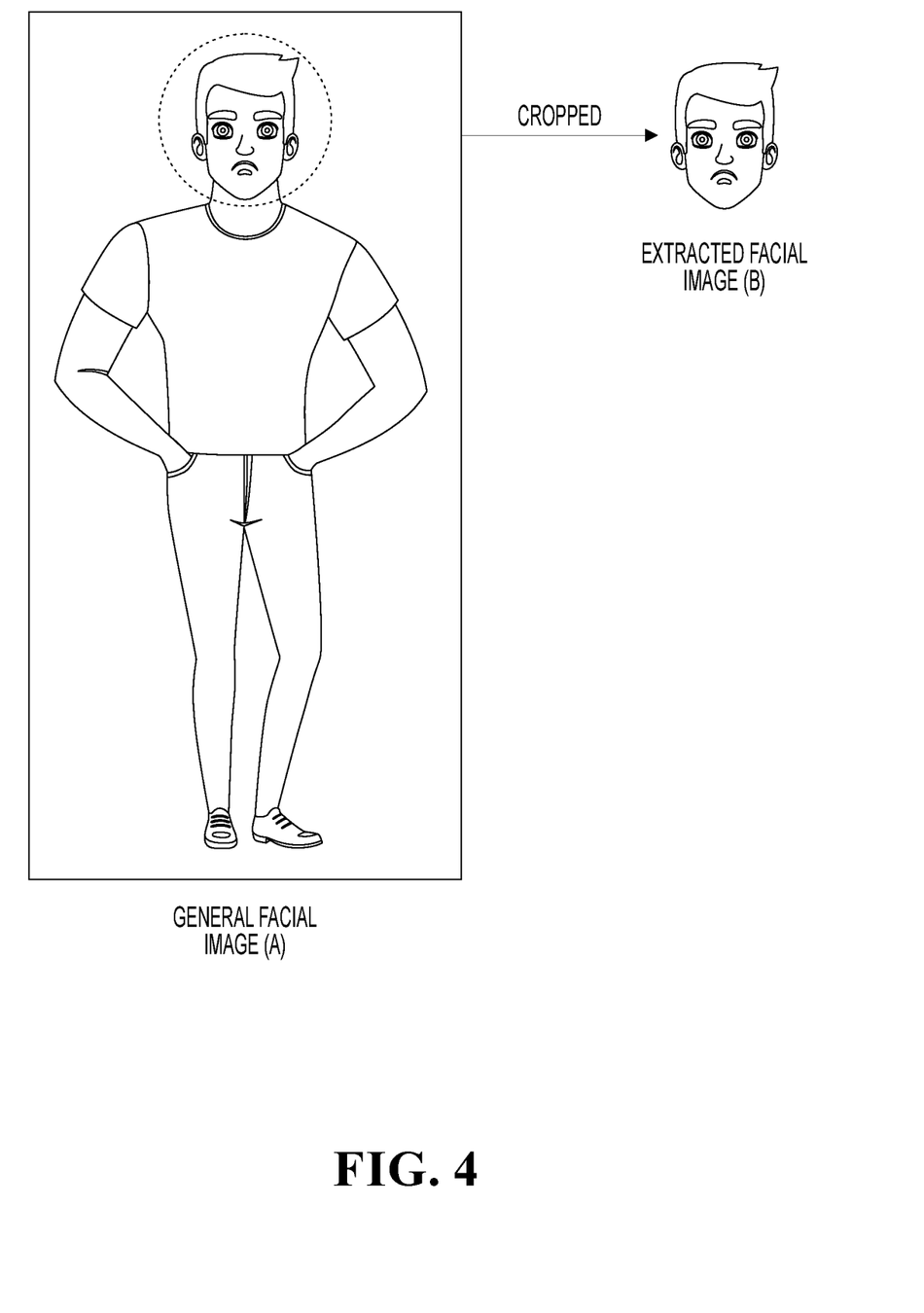
FIG. 4 is a schematic diagram illustrating comparison between a general facial image and an extracted facial image according to an embodiment of the present application.

FIG. 4 is a schematic diagram illustrating comparison between a general facial image and an extracted facial image according to an embodiment of the present application.

In FIG. 4, (a) is a general facial image. For ease of understanding, an extracted facial image is marked in (a) by using dashed lines, and (a) can be correspondingly cropped to obtain an extracted facial image shown in (b).

In addition, when the extracted facial image is an image including only a partial facial region, the general facial image can also be an image including an entire facial region and basically excluding an unrelated region.

In this embodiment of the present application, the extracted facial image used to train the second deep learning model can also include a variety of samples. In the variety of samples, some are live facial images that can be used as positive samples, and some are non-live facial images that can be used as negative samples.

In this embodiment of the present application, the second deep learning model is also a classification model, and the extracted facial images are used as input of the classification model. After model processing, the extracted facial images can be classified into at least the live facial image category or the non-live facial image category. An objective of training the second deep learning model is to improve classification accuracy of the second deep learning model.

In addition to being cropped from the general facial image, the extracted facial image can be obtained by means of special collection without depending on the general facial image.

In this embodiment of the present application, the first deep learning model and the second deep learning model can be different models or a same model before training.

An execution sequence of steps S301 and S302 is not limited to the present application, and step S301 and step S302 can be simultaneously or successively performed.

S303. Perform face liveness detection based on the trained first deep learning model and the trained second deep learning model.

Each step in FIG. 3 can be performed by a same device or a same program, or can be performed by different devices or different programs. For example, step S301 to step S303 are performed by a device 1. For another example, both step S301 and step S302 are performed by a device 1, and step S303 is performed by a device 2; etc.

According to the method in FIG. 3, more live face image features are extracted. Compared with a model in the existing technology, the trained first deep learning model and the trained second deep learning model jointly better express a live face feature, thereby improving accuracy of a face liveness detection result. Therefore, a part or all of problems in the existing technology can be resolved.

Based on the method in FIG. 3, this embodiment of the present application further provides some specific implementation solutions of the method and an extension solution, which are described below.

In this embodiment of the present application, to implement a difference between sensitivity of the first deep learning model to an image feature and sensitivity of the second deep learning model to an image feature, the first deep learning model and the second deep learning model can preferably use different deep learning network structures.

Different network structures of two deep learning models can indicate that the two deep learning models include one or more different network structure parameters. The network structure parameter can include, for example, a quantity of hidden variable layers, a type of a hidden variable layer, a quantity of neuron nodes, a quantity of input layer nodes, or a quantity of output layer nodes.

Some specific deep learning models can also include corresponding specific parameters. For example, for a deep learning model based on a convolutional neural network widely used in the image field currently, a size of a convolution kernel of a convolution unit is also a specific network structure parameter of this deep learning model.

For the solution of the present application, generally, the different deep learning network structures include at least one of the following parameters: a quantity of hidden variable layers, a type of a hidden variable layer, a quantity of neuron nodes, or a size of a convolution kernel of a convolution unit.

In this embodiment of the present application, to improve model training efficiency and model training reliability, model training can be performed in a supervised training manner.

For example, in a supervised training manner, for step S301, the general facial image includes a first label, and the first label indicates whether a general facial image corresponding to the first label is a live facial image.

The training a first deep learning model based on a general facial image can include: inputting the first deep learning model to the general facial image, where the first deep learning model extracts a feature of the general facial image, and predicts, based on the extracted feature, whether the general facial image is a live facial image; and adjusting the first deep learning model based on a prediction result and the first label of the general facial image. Generally, when the prediction result is inconsistent with the first label, the first deep learning model is adjusted, so that the adjusted first deep learning model can obtain, by means of re-prediction, a prediction result consistent with the first label.

The feature extracted by the first deep learning model in a training process can preferably include an image structure feature of the general facial image, for example, a screen photo edge or face distortion in the general facial image.

For another example, similarly, in a supervised training manner, for step S302, the extracted facial image includes a second label, and the second label indicates whether an extracted facial image corresponding to the second label is a live facial image.

The training a second deep learning model based on extracted facial images cropped from the general facial images can include: obtaining the extracted facial images cropped from the general facial images; applying the second deep learning model to the obtained extracted facial image, where the second deep learning model extracts a feature of the extracted facial image, and predicts, based on the extracted feature, whether the extracted facial image is a live facial image; and adjusting the second deep learning model based on a prediction result and the second label of the extracted facial image. Generally, when the prediction result is inconsistent with the second label, the second deep learning model is adjusted, so that the adjusted second deep learning model can obtain a prediction result consistent with the second label by means of re-prediction.

The feature extracted by the second deep learning model in a training process can preferably include an image material feature of the extracted facial image, for example, blurring, texture, or color distortion in the extracted facial image.

In the two examples described above, the first deep learning model and the second deep learning model are differently sensitive to different image features. The first deep learning model is more sensitive to the image structure feature, and the second deep learning model is more sensitive to the image material feature. For a face image, the image structure feature is relatively a global and generalized feature, and the image material feature is relatively a local and refined feature.

Therefore, the trained first deep learning model and the trained second deep learning model can jointly extract a face image feature more hierarchically and abundantly, so as to make a joint decision to obtain a more accurate face liveness detection result.

In this embodiment of the present application, corresponding training data sets and/or corresponding deep learning network structures are different, so that the first deep learning model and the second deep learning model can be differently sensitive to different image features.

For example, if the first deep learning model and the second deep learning model are based on a convolutional neural network, a convolution kernel of a convolution unit in a convolutional neural network that the first deep learning model is based on can be relatively large, so that the first deep learning model extracts an image structure feature of the general facial image. Correspondingly, a convolution kernel of a convolution unit in a convolutional neural network that the second deep learning model is based on can be relatively small, so that the second deep learning model extracts an image material feature of the extracted facial image. Therefore, in this example, the convolution kernel of the convolution unit in the convolutional neural network that the first deep learning model is based on is greater than the convolution kernel of the convolution unit in the convolutional neural network that the second deep learning model is based on.

It should be noted that the size of the convolution kernel is merely an example of a parameter that can affect the sensitivity, and another network structure parameter can also affect the sensitivity.

In this embodiment of the present application, for step S303, the trained first deep learning model and the trained second deep learning model jointly make a decision to perform the face liveness detection. There are a variety of specific decision manners. For example, a separate decision is made by separately using the first deep learning model and the second deep learning model, and then a final decision result is determined by synthesizing all separate decision results. For another example, a separate decision can be first made by using either of the first deep learning model and the second deep learning model. When a separate decision result satisfies a specific condition, the separate decision result can be directly used as a final decision result; otherwise, a decision is comprehensively made in combination with another remaining model, to obtain a final decision result; etc.

If a first manner described in the previous paragraph is used, an example is as follows:

For example, for step S303, the performing face liveness detection based on the trained first deep learning model and the trained second deep learning model can include: obtaining the general facial image (which is generally a face scanning image of a user) collected for the face liveness detection; inputting the trained first deep learning model to the collected general facial image for processing, to obtain corresponding first prediction data; obtaining the extracted facial image cropped from the collected general facial image, and inputting the trained second deep learning model for processing, to obtain corresponding second prediction data; and making a joint decision based on the first prediction data and the second prediction data, to obtain a face liveness detection result for the face scanning image of the user.

The first prediction data can be, for example, the described prediction score PA, and the second prediction data can be, for example, the described prediction score PB. The prediction score is an example of an expression form of the first prediction data and the second prediction data, or there can be another expression form, for example, a probability value or a Boolean value.

Figure 5:
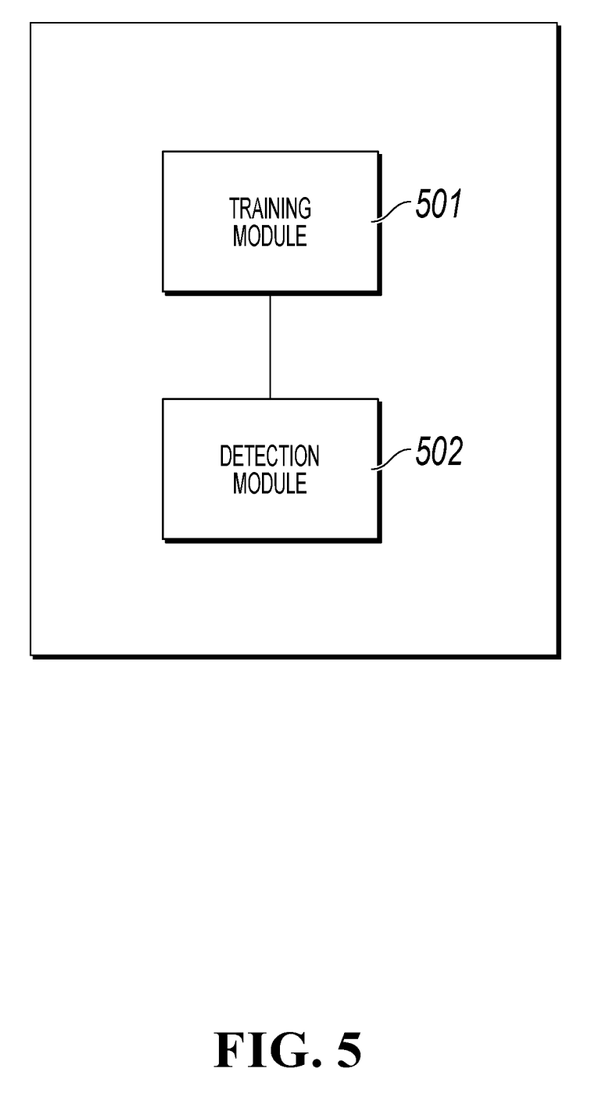
FIG. 5 is a schematic structural diagram illustrating a face liveness detection apparatus corresponding to FIG. 3 according to an embodiment of the present application.

The above is the face liveness detection method provided in this embodiment of the present application. As shown in FIG. 5, based on a same idea of the disclosure, an embodiment of the present application further provides a corresponding apparatus.

FIG. 5 is a schematic structural diagram illustrating a face liveness detection apparatus corresponding to FIG. 3 according to an embodiment of the present application. The apparatus can be located on an execution body of the procedure in FIG. 3, including: a training module 501, configured to: train a first deep learning model based on the general facial images; train a second deep learning model based on the extracted facial images cropped from the general facial images; and a detection module 502, configured to perform face liveness detection based on the trained first deep learning model and the trained second deep learning model.

Optionally, the first deep learning model and the second deep learning model use different deep learning network structures.

Optionally, the different deep learning network structures include at least one of the following parameters: a quantity of hidden variable layers, a type of a hidden variable layer, a quantity of neuron nodes, or a size of a convolution kernel of a convolution unit.

Optionally, the general facial image includes a first label, and the first label indicates whether a general facial image corresponding to the first label is a live facial image.

The training, by the training module 501, a first deep learning model based on the general facial images includes: inputting, by the training module 501, the first deep learning model to the general facial image, where the first deep learning model predicts, based on an image structure feature of the general facial image, whether the general facial image is a live facial image; and adjusting the first deep learning model based on a prediction result and the first label of the general facial image.

Optionally, the extracted facial image includes a second label, and the second label indicates whether an extracted facial image corresponding to the second label is a live facial image.

The training, by the training module 501, a second deep learning model based on the extracted facial images cropped from the general facial images includes: obtaining, by the training module 501, the extracted facial image cropped from the general facial image; and inputting the second deep learning model to the extracted facial image, where the second deep learning model predicts, based on an image material feature of the extracted facial image, whether the extracted facial image is a live facial image; and adjusting the second deep learning model based on a prediction result and the second label of the extracted facial image.

Optionally, the first deep learning model and the second deep learning model are based on a convolutional neural network.

A convolution kernel of a convolution unit in a convolutional neural network that the first deep learning model is based on is greater than a convolution kernel of a convolution unit in a convolutional neural network that the second deep learning model is based on, so that the first deep learning model extracts an image structure feature of the general facial image, and the second deep learning model extracts an image material feature of the extracted facial image.

Optionally, the performing, by the detection module 502, face liveness detection based on the trained first deep learning model and the trained second deep learning model includes: obtaining, by the detection module 502, the general facial image collected for the face liveness detection; inputting the trained first deep learning model to the collected general facial image for processing, to obtain corresponding first prediction data; obtaining extracted facial image cropped from the collected general facial image, and inputting the trained second deep learning model for processing, to obtain corresponding second prediction data; and making a joint decision based on the first prediction data and the second prediction data, to obtain a face liveness detection result for a face scanning image of the user.

Based on a same idea of the disclosure, an embodiment of the present application further provides a corresponding electronic device, including: at least one processor; and a memory communicatively connected to the at least one processor.

The memory stores an instruction that can be executed by the at least one processor, and the instruction is executed by the at least one processor, to enable the at least one processor to: train a first deep learning model based on the general facial images; train a second deep learning model based on the extracted facial images cropped from the general facial images; and perform face liveness detection based on the trained first deep learning model and the trained second deep learning model.

Based on a same idea of the disclosure, an embodiment of the present application further provides a corresponding non-volatile computer storage medium, where the non-volatile computer storage medium stores a computer executable instruction, and the computer executable instruction is set to: train a first deep learning model based on the general facial images; train a second deep learning model based on the extracted facial images cropped from the general facial images; and perform face liveness detection based on the trained first deep learning model and the trained second deep learning model.

The embodiments in this specification are all described in a progressive manner, for same or similar parts in the embodiments, reference can be made to these embodiments, and each embodiment focuses on a difference from other embodiments. Especially, an apparatus embodiment, an electronic device embodiment, a non-volatile computer storage medium embodiment are basically similar to a method embodiment, and therefore is described briefly; for related parts, reference is made to partial descriptions in the method embodiment.

The apparatus, the electronic device, and the non-volatile computer storage medium provided in the embodiments of the present application correspond to the method. Therefore, the apparatus, the electronic device, and the non-volatile computer storage medium also have beneficial technical effects similar to a beneficial technical effect of the corresponding method. The beneficial technical effect of the method is described in detail above, so that the beneficial technical effects of the corresponding apparatus, electronic device, and non-volatile computer storage medium are not described here again.

In the 1990s, whether technology improvement is hardware improvement (for example, improvement of a circuit structure, such as a diode, a transistor, or a switch) or software improvement (improvement of a method procedure) can be obviously distinguished. However, as technologies develop, improvement of many current method procedures can be considered as direct improvement of a hardware circuit structure. A designer usually programs an improved method procedure to a hardware circuit to obtain a corresponding hardware circuit structure. Therefore, a method procedure can be improved by hardware entity modules. For example, a programmable logic device (PLD) (e.g., a field programmable gate array (FPGA)) is such an integrated circuit, and a logical function of the programmable logic device is determined by a user by means of device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used to develop and compose a program. However, original code obtained before compilation is also written in a specific programming language, and this is referred to as hardware description language (Hardware Description Language, HDL). However, there are various HDLs, such as an ABEL (Advanced Boolean Expression Language), an AHDL (Altera Hardware Description Language), Confluence, a CUPL (Cornell University Programming Language), HDCal, a JHDL (Java Hardware Description Language), Lava, Lola, MyHDL, PALASM, and an RHDL (Ruby Hardware Description Language). Currently, a VHDL (Very-High-Speed Integrated Circuit Hardware Description Language) and Verilog are most popular. A person skilled in the art should also understand that, because logic programming with respect to the method procedure is performed by using several described hardware description languages, and the several described hardware description languages can be programmed to an integrated circuit, a hardware circuit that implements the logical method procedure can be obtained.

A controller can be implemented in any appropriate manner. For example, the controller can use a microprocessor or a processor, and can store forms of a computer readable medium, a logic gate, a switch, an application-specific integrated circuit (ASIC), a programmable logic controller, and an embedded microcontroller that are of computer readable program code (e.g., software or hardware) that can be executed by the (micro) processor. The examples of controller include but are not limited to the following microcontrollers: ARC 625D, Atmel AT91SAM, Microchip PIC18F26K20, or Silicone Labs C8051F320. A memory controller can also be implemented as a part of control logic of the memory. A person skilled in the art also knows that, in addition to implementing the controller in a pure computer readable program code manner, logic programming can be completely performed by using the method step, so that the controller implements a same function in a form of a logical gate, a switch, an application-specific integrated circuit, a programmable logic controller, an embedded microcontroller, etc. Therefore, the controller can be considered as a hardware component, and an apparatus for implementing various functions in the controller can also be considered as a structure in a hardware component. Alternatively, an apparatus configured to implement various functions can be considered as a software module or a structure in a hardware component that can implement the method.

The system, apparatus, module, or unit described in the described embodiments can be implemented by a computer chip or an entity, or implemented by a product with a function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the described apparatus is described by dividing functions into various units. When the present application is implemented, the functions of each unit can be implemented in one or more pieces of software and/or hardware.

A person skilled in the art should understand that the embodiments of the present disclosure can be provided as a method, a system, or a computer program product. Therefore, the present disclosure can use a form of hardware-only embodiments, software-only embodiments, or embodiments with a combination of software and hardware. In addition, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product according to the embodiments of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

These computer program instructions can be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded to a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts or in one or more blocks in the block diagrams.

In typical configuration, the computing device includes one or more processors (CPU), an input/output interface, a network interface, and a memory.

The memory can include a form of a volatile memory, a random access memory (RAM) and/or a non-volatile memory, etc. in a computer readable medium, such as a read-only memory (ROM) or a flash memory (flash RAM). The memory is an example of the computer readable medium.

The computer readable medium includes volatile and non-volatile, removable and non-removable media, and can store information by using any method or technology. The information can be a computer readable instruction, a data structure, a program module, or other data. The examples of computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission medium. The computer storage medium can be used to store information that can be accessed by the computing device. As described in this specification, the computer readable medium does not include transitory media (transitory media), for example, a modulated data signal and a carrier.

It should be further noted that, terms "include", "contain", or their any other variant is intended to cover non-exclusive inclusion, so that a process, a method, an article, or a device that includes a series of elements not only includes these very elements, but also includes other elements which are not expressly listed, or further includes elements inherent to such process, method, article, or device. An element preceded by "includes a . . . " does not, without more constraints, preclude the existence of additional identical elements in the process, method, article, or device that includes the element.

The present application can be described in common contexts of computer executable instructions executed by a computer, such as a program module. Generally, the program module includes a routine, a program, an object, a component, a data structure, etc. executing a specific task or implementing a specific abstract data type. The present application can also be practiced in distributed computing environments. In these distributed computing environments, tasks are executed by remote processing devices that are connected by using a communications network. In the distributed computing environments, the program module can be located in local and remote computer storage media that include storage devices.

The embodiments in this specification are all described in a progressive manner, for same or similar parts in the embodiments, reference can be made to these embodiments, and each embodiment focuses on a difference from other embodiments. Especially, a system embodiment is basically similar to a method embodiment, and therefore is described briefly; for related parts, reference can be made to partial descriptions in the method embodiment.

The previous descriptions are merely embodiments of the present application, and are not intended to limit the present application. For a person skilled in the art, the present application can have various modifications and changes. Any modifications, equivalent replacements, improvements, etc. made within the spirit and principle of the present application shall fall within the protection scope of the present application.

Figure 6:
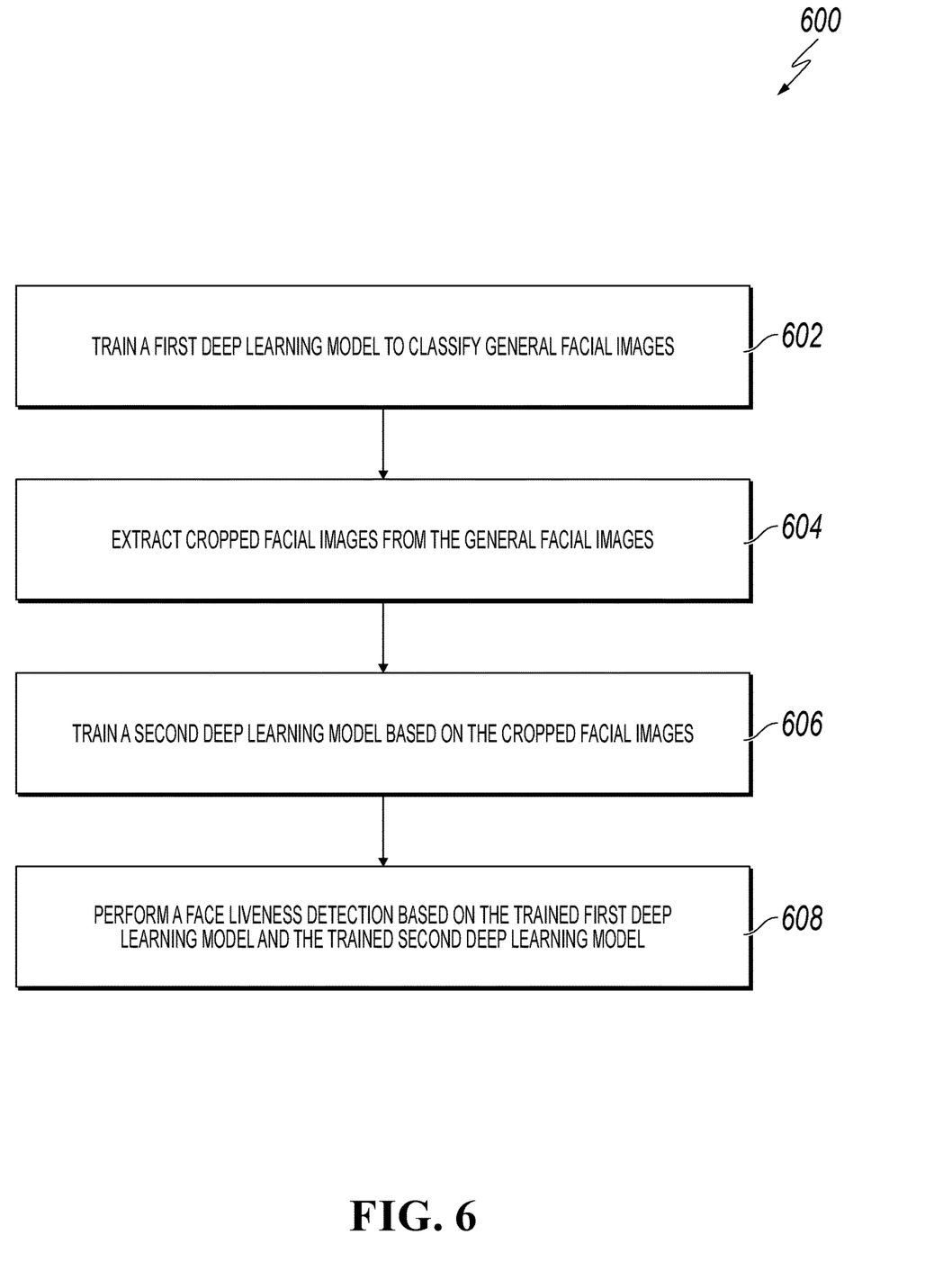
FIG. 6 is a flowchart illustrating an example of a computer-implemented method for determining user authenticity with face liveness detection, according to an implementation of the present disclosure.

FIG. 6 is a flowchart illustrating an example of a computer-implemented method 600 for determining user authenticity with face liveness detection, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a first deep learning model is trained to classify general facial images. The general facial images are classified into at least live facial images and non-live facial images. In some implementations, the live facial images are considered to be positive samples and the non-live facial images are considered to be negative samples. In some implementations, the first deep learning model is a classification model and the general facial images are used as inputs of the first deep learning model. Training the first deep learning model improves classification accuracy with respect to the general facial images.

In some implementations, a particular general facial image includes a first label indicating whether the particular general facial image corresponding to the first label is a live facial image. In some implementations, the training of the first deep learning model includes: 1) inputting the particular general facial image to the first deep learning model to generate a first prediction result, based on an image structure feature of the particular general facial image, of whether the particular general facial image is a live facial image and 2) adjusting the first deep learning model based on the first prediction result and the first label. From 602, method 600 proceeds to 604.

At 604, cropped facial images are extracted from the general facial images. In some implementations, a particular cropped facial image includes a second label, and the second label indicates whether the particular cropped facial image corresponding to the second label is a live facial image. In some implementations, the training of the second deep learning model based on the cropped facial image includes: 1) obtaining the particular cropped facial image; 2) inputting the particular cropped facial image to the second deep learning model to generate a second prediction result, based on an image material feature of the particular cropped facial image, of whether particular cropped facial image is a live facial image; and 3) adjusting the second deep learning model based on the second prediction result and the second label. From 604, method 600 proceeds to 606.

At 606, a second deep learning model is trained based on the cropped facial images. From 606, method 600 proceeds to 608.

At 608, a face liveness detection is performed based on the trained first deep learning model and the trained second deep learning model. In some implementations, the first deep learning model and the second deep learning model are based on a convolutional neural network, and wherein a convolution kernel of a convolution unit in a convolutional neural network of the first deep learning model is greater than a convolution kernel of a convolution unit in a convolutional neural network of the second deep learning model. After 608, method 600 stops.

In some implementations, the face liveness detection includes: 1) obtaining a general facial image; 2) inputting the general facial image into the trained first deep learning model to obtain corresponding first prediction data; 3) obtaining a cropped facial image from the general facial image; 4) inputting the cropped facial image into the trained second deep learning model to obtain corresponding second prediction data; and 5) making a joint decision based on the first prediction data and the second prediction data to obtain a face liveness detection result. From 608, method 600 proceeds to 610.

Implementations of the subject matter described in this specification can be implemented so as to realize particular advantages or technical effects. The described face liveness detection can be used to enhance authentication processes and to ensure data security. For example, the described method can be used to distinguish between images of a live and non-live human face to help avoid fraud and malicious behavior with respect to secured data. The described method can be incorporated into computing devices (such as, mobile computing devices and digital imaging devices).

The face liveness result can be displayed on a graphical user interface. Based on the face liveness result, a determination of whether to perform subsequent actions (for example, unlocking secured data, operating a software application, storing data, sending data across a network, or displaying data on a graphical user interface).

The described methodology permits enhancement of various mobile computing device transactions and overall transaction/data security. Participants in transactions using mobile computing devices can be confident that facial images used to unlock a mobile computing device or to authorize a transaction are valid and that they will not be victims of fraud.

The described methodology can ensure the efficient usage of computer resources (for example, processing cycles, network bandwidth, and memory usage), through the efficient verification of data/transactions. At least these actions can minimize or prevent waste of available computer resources with respect to multiple parties in a mobile computing transactions by preventing undesired/fraudulent transactions. Instead of users needing to verify data with additional research or transactions, transactions can be depended upon as valid.

In some implementations, a graphical user interface can be analyzed to ensure that graphical elements used in face liveness detection operations (for example, scanning and verification of the liveness of a human face with a mobile computing device) can be positioned on graphical user interfaces to be least obtrusive for a user (for example, to obscure the least amount of data and to avoid covering any critical or often-used graphical user interface elements).

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    training a first deep learning model to classify general facial images, wherein the general facial images comprise non-facial regions, and wherein the first deep learning model is trained to extract image structure features of non-facial regions of the general facial images;
    extracting cropped facial images from the general facial images;
    training a second deep learning model based on the cropped facial images; and
    performing face liveness detection based on the trained first deep learning model and the trained second deep learning model.

2. The computer-implemented method of claim 1, wherein the general facial images are classified into at least live facial images and non-live facial images, wherein the live facial images are positive samples and the non-live facial images are negative samples.

3. The computer-implemented method of claim 2, wherein the first deep learning model is a classification model and the general facial images are used as inputs of the first deep learning model, and wherein training the first deep learning model improves classification accuracy with respect to the general facial images.

4. The computer-implemented method of claim 1, wherein a particular general facial image comprises a first label indicating whether the particular general facial image corresponding to the first label is a live facial image, and wherein the training of the first deep learning model comprises:
    inputting the particular general facial image to the first deep learning model to generate a first prediction result, based on an image structure feature of the particular general facial image, of whether the particular general facial image is a live facial image; and
    adjusting the first deep learning model based on the first prediction result and the first label.

5. The computer-implemented method of claim 1, wherein a particular cropped facial image comprises a second label, and the second label indicates whether the particular cropped facial image corresponding to the second label is a live facial image and the training of the second deep learning model based on the cropped facial images comprises:
    obtaining the particular cropped facial image;
    inputting the particular cropped facial image to the second deep learning model to generate a second prediction result, based on an image material feature of the particular cropped facial image, of whether particular cropped facial image is a live facial image; and adjusting the second deep learning model based on the second prediction result and the second label.

6. The computer-implemented method of claim 1, wherein the first deep learning model and the second deep learning model are based on a convolutional neural network, and wherein a convolution kernel of a convolution unit in a convolutional neural network of the first deep learning model is greater than a convolution kernel of a convolution unit in a convolutional neural network of the second deep learning model.

7. The computer-implemented method of claim 1, wherein the face liveness detection comprises:
   obtaining a general facial image;
   inputting the general facial image into the trained first deep learning model to obtain corresponding first prediction data;
   obtaining a cropped facial image from the general facial image;
   inputting the cropped facial image into the trained second deep learning model to obtain corresponding second prediction data; and
   making a joint decision based on the first prediction data and the second prediction data to obtain a face liveness detection result.

8. A non-transitory, computer-readable medium storing one or more instructions executable by a computer system to perform operations comprising:
   training a first deep learning model to classify general facial images, wherein the general facial images comprise non-facial regions, and wherein the first deep learning model is trained to extract image structure features of non-facial regions of the general facial images;
   extracting cropped facial images from the general facial images;
   training a second deep learning model based on the cropped facial images; and
   performing face liveness detection based on the trained first deep learning model and the trained second deep learning model.

9. The non-transitory, computer-readable medium of claim 8, wherein the general facial images are classified into at least live facial images and non-live facial images, wherein the live facial images are positive samples and the non-live facial images are negative samples.

10. The non-transitory, computer-readable medium of claim 9, wherein the first deep learning model is a classification model and the general facial images are used as inputs of the first deep learning model, and wherein training the first deep learning model improves classification accuracy with respect to the general facial images.

11. The non-transitory, computer-readable medium of claim 8, wherein a particular general facial image comprises a first label indicating whether the particular general facial image corresponding to the first label is a live facial image, and wherein the training of the first deep learning model comprises:
   inputting the particular general facial image to the first deep learning model to generate a first prediction result, based on an image structure feature of the particular general facial image, of whether the particular general facial image is a live facial image; and
   adjusting the first deep learning model based on the first prediction result and the first label.

12. The non-transitory, computer-readable medium of claim 8, wherein a particular cropped facial image comprises a second label, and the second label indicates whether the particular cropped facial image corresponding to the second label is a live facial image and the training of the second deep learning model based on the cropped facial images comprises:
   obtaining the particular cropped facial image;
   inputting the particular cropped facial image to the second deep learning model to generate a second prediction result, based on an image material feature of the particular cropped facial image, of whether particular cropped facial image is a live facial image; and
   adjusting the second deep learning model based on the second prediction result and the second label.

13. The non-transitory, computer-readable medium of claim 8, wherein the first deep learning model and the second deep learning model are based on a convolutional neural network, and wherein a convolution kernel of a convolution unit in a convolutional neural network of the first deep learning model is greater than a convolution kernel of a convolution unit in a convolutional neural network of the second deep learning model.

14. The non-transitory, computer-readable medium of claim 8, wherein the face liveness detection comprises:
   obtaining a general facial image;
   inputting the general facial image into the trained first deep learning model to obtain corresponding first prediction data;
   obtaining a cropped facial image from the general facial image;
   inputting the cropped facial image into the trained second deep learning model to obtain corresponding second prediction data; and
   making a joint decision based on the first prediction data and the second prediction data to obtain a face liveness detection result.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      training a first deep learning model to classify general facial images, wherein the general facial images comprise non-facial regions, and wherein the first deep learning model is trained to extract image structure features of non-facial regions of the general facial images;
      extracting cropped facial images from the general facial images;
      training a second deep learning model based on the cropped facial images; and
      performing face liveness detection based on the trained first deep learning model and the trained second deep learning model.

16. The computer-implemented system of claim 15, wherein the general facial images are classified into at least live facial images and non-live facial images, wherein the live facial images are positive samples and the non-live facial images are negative samples.

17. The computer-implemented system of claim 16, wherein the first deep learning model is a classification model and the general facial images are used as inputs of the first deep learning model, and wherein training the first deep learning model improves classification accuracy with respect to the general facial images.

18. The computer-implemented system of claim 15, wherein a particular general facial image comprises a first label indicating whether the particular general facial image corresponding to the first label is a live facial image, and wherein the training of the first deep learning model comprises:
- inputting the particular general facial image to the first deep learning model to generate a first prediction result, based on an image structure feature of the particular general facial image, of whether the particular general facial image is a live facial image; and
- adjusting the first deep learning model based on the first prediction result and the first label.

19. The computer-implemented system of claim 15, wherein a particular cropped facial image comprises a second label, and the second label indicates whether the particular cropped facial image corresponding to the second label is a live facial image and the training of the second deep learning model based on the cropped facial images comprises:
- obtaining the particular cropped facial image;
- inputting the particular cropped facial image to the second deep learning model to generate a second prediction result, based on an image material feature of the particular cropped facial image, of whether particular cropped facial image is a live facial image; and
- adjusting the second deep learning model based on the second prediction result and the second label.

20. The computer-implemented system of claim 15, wherein the first deep learning model and the second deep learning model are based on a convolutional neural network, and wherein a convolution kernel of a convolution unit in a convolutional neural network of the first deep learning model is greater than a convolution kernel of a convolution unit in a convolutional neural network of the second deep learning model.

\* \* \* \* \*